United States Patent [19]

Maru

[11] Patent Number: 5,430,415
[45] Date of Patent: Jul. 4, 1995

[54] MODULATOR CAPABLE OF DECREASING CONSUMPTION OF ELECTRIC POWER

[75] Inventor: Tsuguo Maru, Tokyo, Japan

[73] Assignee: NEC Corporation, Tokyo, Japan

[21] Appl. No.: 226,547

[22] Filed: Apr. 12, 1994

[30] Foreign Application Priority Data

Apr. 12, 1993 [JP] Japan ..................... 5-083698

[51] Int. Cl.⁶ ............... H03C 3/00; H04L 27/00
[52] U.S. Cl. ................... 332/103; 375/296; 375/308
[58] Field of Search ........... 332/103, 104, 105, 144, 332/146; 333/173; 375/39, 57, 58, 60, 67

[56] References Cited

U.S. PATENT DOCUMENTS

| | | | |
|---|---|---|---|
| 4,229,821 | 10/1980 | de Jager et al. | 375/53 |
| 4,736,389 | 4/1988 | Debus, Jr. et al. | 332/104 X |
| 4,737,969 | 4/1988 | Steel et al. | 375/60 X |
| 4,764,940 | 8/1988 | Paneth et al. | 375/67 |
| 4,901,333 | 2/1990 | Hodgkiss | 375/98 |
| 5,177,455 | 1/1993 | Bennett | 332/103 |
| 5,319,676 | 1/1994 | Van Dasler et al. | 375/60 |

OTHER PUBLICATIONS

H. Suzuki, et al. "Digital Implementation of Orthogonal Modulator for FM", *IEICE Technical Report*, No. CS79-250, pp. 31-36, 1979. (no month).

Primary Examiner—David Mis
Attorney, Agent, or Firm—Ostrolenk, Faber, Gerb & Soffen

[57] ABSTRACT

In a modulator supplied with an input digital signal for outputting an output signal therefrom in accordance with the input digital signal, the modulator has a first producing section for producing a phase information signal on the basis of the input digital signal. The phase information signal is representative of phase information of the input digital signal. A memory section memorizes an impulse response data of the phase information that has a predetermined data length. An accessing section accesses the memory section to produce impulse response values of the impulse response data in accordance with the phase information signal. A second producing section produces a modulated signal on the basis of the impulse response values. A shaping section shapes the modulated signal into a shaped modulated signal in accordance with a predetermined window function to produce the shaped modulated signal as the output signal.

11 Claims, 4 Drawing Sheets

MODULATOR CAPABLE OF DECREASING CONSUMPTION OF ELECTRIC POWER

BACKGROUND OF THE INVENTION

This invention relates to a modulator for use in a mobile telecommunication system.

In general, a mobile telecommunication system comprises a plurality of radio telephone terminals and at least one base station. Each of the radio telephone terminals has a quadrature modulator for quadrature modulating an input digital signal into a transmitting signal which is transmitted to the base station. The transmitting signal may be transmitted to the base station through one of channels. The input digital signal may be, for example, a digital speech signal.

Such a quadrature modulator is disclosed in a title of "Digital Implementation of Orthogonal Modulator for FM" contributed by H. Suzuki et al to IEICE Technical Report, No. CS79-250, 1979, pages 31 to 36. The quadrature modulator disclosed by H. Suzuki et al comprises a complex vector modulator section, a radio frequency (RF) section, and a combining section. The complex vector modulator section will be merely called a modulator hereinunder. The modulator is supplied with the input digital signal and produces an inphase component signal and a quadrature component signal on the basis of the input digital signal. The inphase and the quadrature component signals may be collectively called an output signal. The RF section frequency converts the inphase component signal and the quadrature component signal into a converted inphase component signal and a converted quadrature component signal, respectively. The combining section combines the converted inphase component signal and the converted quadrature component signal to produce the transmitting signal.

The input digital signal is composed of a plurality of symbols. In order to restrict a band width which the transmitting signal occupies and in order to minimize intersymbol interference and inter-channel interference, the modulator carries out Nyquist waveform shaping process of an impulse response of each symbol on producing the inphase component signal and the quadrature component signal as well known in the art.

By the way, it is known in the art that time division multiple access (TDMA) is used in the mobile telecommunication system. In TDMA, one of time slots is assigned as a specific time slot to a specific one of the radio telephone terminals. When the specific radio telephone terminal transmits the transmitting signal to the base station in the specific time slot, the specific radio telephone terminal transmits the transmitting signal as a burst signal to the base station.

On transmitting the burst signal, the inter-channel interference inevitably occurs at a start of the burst signal and an end of the burst signal because a spectrum becomes wide in the burst signal. In addition, inter-slot interference inevitably occurs in the base station because the spectrum becomes wide in the burst signal by a receiving filter of the base station.

In order to decrease the inter-channel interference and the inter-slot interference, it is known in the art to carry out a wave shaping of the burst signal at the start and the end of the burst signal by a predetermined window function. The predetermined window function may be, for example, Hanning window function.

A conventional modulator comprises a read-only-memory (ROM) for memorizing first through N-th impulse response data each of which is defined by an impulse response of phase information of the input digital signal, where N represents a positive integer which is not less than one. Namely, each of the first through the N-th impulse response data is defined by an impulse response function. More particularly, the first impulse response data is produced by multiplying the impulse response and a first coefficient which is weighted by the use of the predetermined window function. Similarly, the N-th shaping data is produced by multiplying the impulse response and an N-th coefficient which is weighted by the use of the predetermined window function.

In order to carry out the wave shaping of the burst signal at the start and the end of the burst signal, the first through the N-th impulse response data are selectively read as a read impulse response data out of the ROM in accordance with the input digital signal. Namely, the conventional modulator produces the output signal by the use of the read impulse response data.

However, it is necessary for the conventional modulator to make the ROM have a large capacity inasmuch as the ROM memorizes the first through the N-th impulse response data. Namely, the ROM itself becomes large.

As a result, the conventional modulator becomes large inasmuch as the ROM itself becomes large. Furthermore, the ROM is frequently accessed inasmuch as the ROM memorizes first through the N-th impulse response data. Accordingly, consumption of an electric power increases in the conventional modulator.

SUMMARY OF THE INVENTION

It is therefore an object of this invention to provide a modulator of a small type.

It is another object of this invention to provide a modulator capable of decreasing consumption of an electric power.

Other objects of this invention will become clear as the description proceeds.

According to this invention, there is provided a modulator supplied with an input digital signal for outputting an output signal therefrom in accordance with the input digital signal. The modulator comprises first producing means, on the basis of the input digital signal, for producing a phase information signal representative of phase information of the input digital signal, memory means for memorizing an impulse response data of the phase information that has a predetermined data length, accessing means for accessing the memory means to produce impulse response values of the impulse response data in accordance with the phase information signal, second producing means supplied with the impulse response values for producing a modulated signal on the basis of the impulse response values, and shaping means for shaping the modulated signal into a shaped modulated signal in accordance with a predetermined window function to produce the shaped modulated signal as the output signal.

DESCRIPTION OF THE PREFERRED EMBODIMENT

Figure 1:
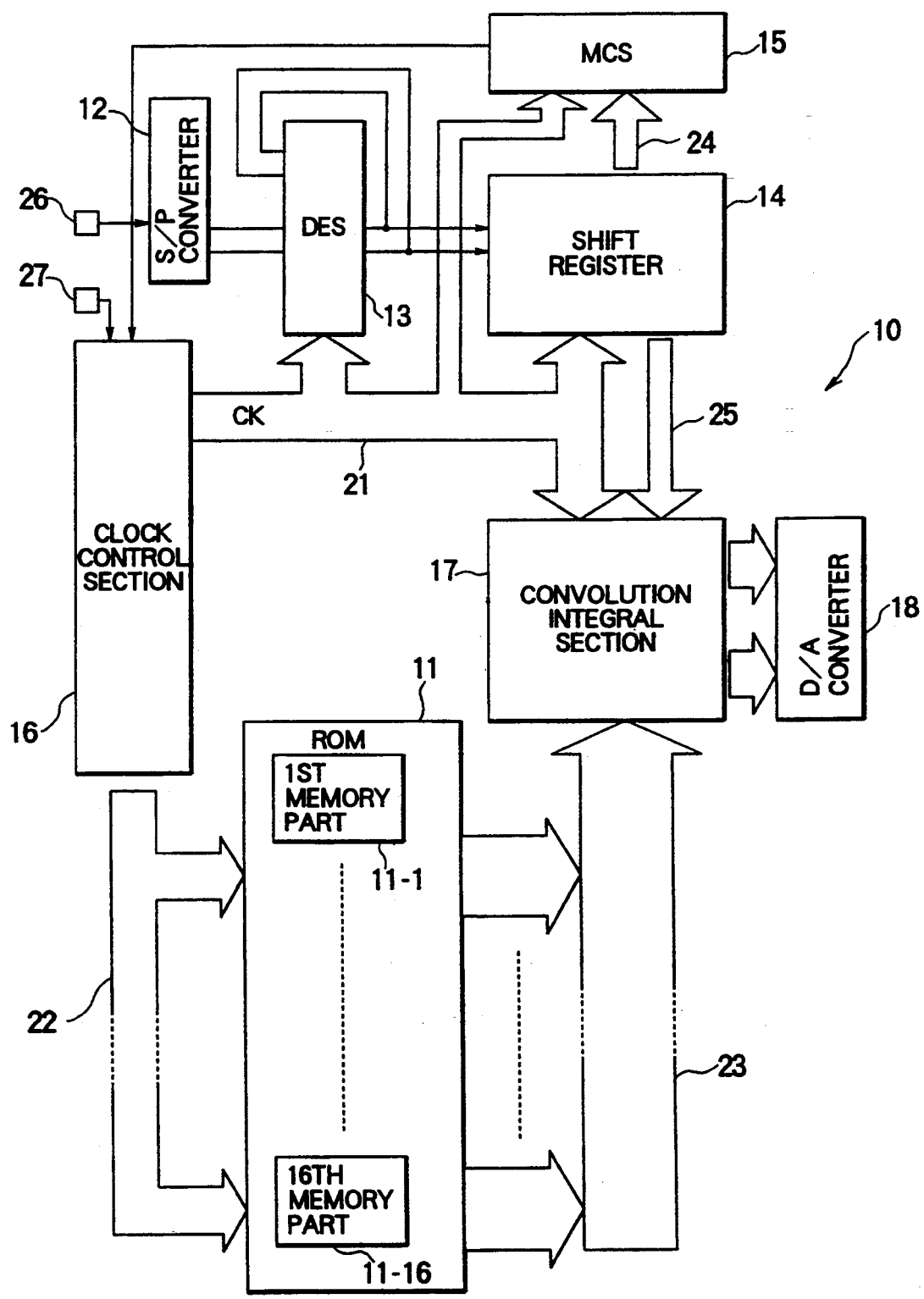
FIG. 1 is a block diagram of a conventional modulator.

Referring to FIG. 1, description will first be made as regards a conventional modulator for a better understanding of this invention. The illustrated modulator 10 may implement $\pi/4$ shift quadrature phase shift keying (QPSK) and may be used in a mobile telecommunication system which comprises a plurality of radio telephone terminals and at least one base station. More particularly, each of the radio telephone terminals has the modulator 10 in order to communicate with the base station.

When a specific one of the radio telephone terminals communicates with the base station, the modulator 10 is supplied with an input digital signal and produces an output signal having inphase (I) and quadrature (Q) signals in the specific radio telephone terminal. The output signal is processed into a transmitting signal which is transmitted through a radio channel to the base station. More specifically, a specific one of time slots is assigned as a specific time slot to the specific radio telephone terminal. When the specific radio telephone terminal transmits the transmitting signal to the base station, the specific radio telephone terminal transmits the transmitting signal as a burst signal to the base station in the specific time slot.

The modulator 10 comprises a ROM section 11 which has first through N-th memory parts 11-1 to 11-N, where N represents a positive integer which is not less than one. In the example being illustrated, the positive integer is equal to sixteen. The first through the sixteenth memory parts 11-1 to 11-16 memorize first through sixteenth impulse response data, respectively. Each of the first through the sixteenth impulse response data is defined by an impulse response of phase information of the input digital signal. Namely, each of the first through the sixteenth impulse response data is defined by an impulse response function.

More particularly, the first impulse response data is produced by multiplying the impulse response and a first coefficient which is weighted by the use of a predetermined window function. The predetermined window function may be, for example, Hanning window function. The second impulse response data is produced by multiplying the impulse response and a second coefficient which is weighted by the use of the predetermined window function. Similarly, the sixteenth impulse response data is produced by multiplying the impulse response and a sixteenth coefficient which is weighted by the use of the predetermined window function. In the illustrated example, the first coefficient is a smallest coefficient. The sixteenth coefficient is a largest coefficient. The first through the sixteenth coefficients become larger and larger in an ascending order. Each of the first through the sixteenth impulse response data has a predetermined data length truncated on the basis of a truncation symbol number. In the illustrated example, the predetermined data length is equal to sixteen bits.

Each of the first through the sixteenth impulse response data has primary and subsidiary impulse response sequence which are different from each other in amplitude. The primary impulse response sequence has a primary amplitude which is equal to a unit amplitude.

The subsidiary impulse response sequence has a subsidiary amplitude which is equal to $\frac{1}{2}$ of the unit amplitude. Furthermore, each of the primary and the subsidiary impulse response sequences has an impulse value at each of sliced times.

The modulator 10 further comprises a serial-parallel (S/P) converter 12, a differential encoder section (DES) 13, a truncation symbol shift register section 14, a multiplication control section (MCS) 15, a clock control section 16, a convolution integral section 17, and a digital-analog (D/A) converter 18. The clock control section is connected to the differential encoder section 13, the truncation symbol shift register section 14, the multiplication control section 15, and the convolution integral section 17 through a first bus 21. The clock control section 16 is further connected to the ROM section 11 through a second bus 22. The ROM section 11 is connected to the convolution integral section 17 through a third bus 23. Furthermore, the truncation symbol shift register section 14 is connected to the multiplication control section 15 and the convolution integral section 17 through fourth and fifth buses 24 and 25.

On processing the input digital signal into the output signal, the input digital signal is serially supplied through an input terminal 26 to the serial-parallel converter 12. The input digital signal has a plurality of symbols. In the example being illustrated, each of the symbols is composed of two bits.

Supplied with the input digital signal, the serial-parallel converter 12 converts the input digital signal into a parallel data signal to supply the parallel data signal as an input signal to the differential encoder section 13. The clock control section 16 supplies a clock signal. CK to the differential encoder section 13, the truncation symbol shift register section 14, and the multiplication control section 15 through the first bus 21. Each of the differential encoder section 13, the truncation symbol shift register section 14, and the multiplication control section 15 is put into operation. The clock signal CK has a predetermined period which is defined by a symbol rate of the input digital signal, the number of truncation symbols, and the number of interpolations adopted for approximating the impulse response function.

The differential encoder section 13 encodes the input signal into an encoded signal in accordance with the clock signal CK. More specifically, the differential encoder section 13 carries out differential encoding of the input signal to produce the encoded signal as a differential encoded signal DC which is representative of phase information. The differential encoded signal is supplied to the truncation symbol shift register section 14.

The differential encoded signal is composed of a plurality of differential data each of which is composed of a differential symbol having two bits. The truncation symbol shift register section 14 has the predetermined data length. In the illustrated example, the predetermined data length is sixteen bits length. The truncation symbol shift register section 14 successively receives the differential data and shifts the differential data therein in accordance with the clock signal CK. As a result, the truncation symbol shift register section 14 registers the differential data of eight as a registered data sequence during a time interval corresponding to the number of truncation symbols.

With reference to the registered data sequence, the multiplication control 15 produces a command signal to supply the command signal to the clock control section 16. The command signal is representative of a high order bit of an address signal which will later be described.

On the other hand, the clock control section 16 is supplied with a burst start signal from a burst start/end terminal 27 on carrying out QPSK. Supplied with the command signal and the burst start signal, the clock control section 16 produces a set of address signals. More specifically, the clock control section 16 produces first through sixteenth address signals to be supplied to the ROM section 11 in an ascending order.

Now, it will be assumed that the phase information represents eight positions apart from each other by $\pi/4$ radians on I-Q coordinate plane. Each of the first through the sixteenth address signals has the high order bit which corresponds to either one of 1 and $1/\sqrt{2}$ in I-Q coordinates. Namely, the high order bit is used for selecting one of the primary and the subsidiary impulse response sequences in each of the first through the sixteenth impulse response data. Furthermore, the first through the sixteenth address signals have first through sixteenth lower order bits, respectively. The first through the sixteenth lower order bits are periodically changed corresponding to each of sliced times for the first through the sixteenth impulse response data, respectively.

Supplied with first address signal, a first impulse value is read out of the first memory part 11-1 to be supplied to the convolution integral section 17. Similarly, second through sixteenth read impulse values are read out of the second through the sixteenth memory parts 11-2 to 11-16 in response to the second through the sixteenth address signals, respectively, to be supplied to the convolution integral section 17.

The convolution integral section 17 is supplied with a control signal from the differential truncation shift register section 14 through the fifth bus 25, The control signal is representative of the phase information. The convolution integral section 17 carries out convolution integral in accordance with the control signal. When the control signal is representative of either 1 or $1/\sqrt{2}$ in I- or Q-coordinate, the convolutional integral section 17 is operable to add a new coming output impulse signal from the ROM section 11 to the impulse value which remains in the convolution integral section 17 as a last result of the addition so that the convolution integral section 17 generates a convolution integral data signal, When the control signal is representative of $-1$ or $-1/\sqrt{2}$ in I- or Q-coordinate, the convolution integral section 17 is operable to subtract the new coming output impulse value from the last result to produce the convolution integral data signal, As described above, the convolution integral section 17 carries out convolution integral to produce the convolution integral data signal. The convolution integral data signal comprises a digitized inphase component signal and a digitized quadrature component signal, The digitized inphase component signal and the digitized quadrature component signal are supplied from the convolution integral section 17 to the D/A converter 18 to be converted to an inphase component signal and a quadrature component signal, respectively. The inphase component signal has an inphase component ID and an inverse inphase component IBD. The quadrature component signal has a quadrature component QD and an inverse quadrature component QBD. The inphase component signal and the quadrature component signal are collectively outputted from the D/A converter section 18 as the output signal which may be called a $\pi/4$ shift QPSK modulated signal.

After that, the clock control section 16 continues producing only one of the first through the sixteenth address signals. In the illustrated example, the clock control section continues producing the sixteenth address signal. As a result the sixteenth impulse values are successively read out of the sixteenth memory part 11-16 in accordance with the sixteenth address signal. In this case, the sixteenth impulse values may be different from one another. The convolution integral section 17 successively receives the sixteenth impulse values and carries out convolution integral in a manner similar to the above description to produce the convolution integral data signal which is supplied to the D/A converter 18.

When the clock control section 16 is supplied with a burst end signal from the burst start/end terminal 21, the clock control section 16 supplies the first through the sixteenth address signals in a descending order. Responsive to the sixteenth address signal, the sixteenth impulse value is read out of the sixteenth memory part 11-16 to be supplied to the convolution integral section 17. Similarly, the fifteenth through the first impulse response values are read out of the fifteenth through the first memory parts 11-15 to 11-1 in response to the fifteenth through the first address signals, respectively, to be supplied to the convolution integral section 17.

The convolution section 17 carries out convolution integral in a similar manner described above to produce the convolution integral data signal which is supplied to the D/A converter section 18.

As described above, the modulator 10 produces the output signal by the use of the first through the sixteenth impulse response data at the start and the end of the burst signal. As a result, it is possible to make the burst signal shape at the start and the end of the burst signal. Therefore, it is possible to decrease the interchannel interference.

However, it is necessary for the ROM section 11 to have a large capacity inasmuch as the ROM section 11 memorizes the first through the sixteenth impulse response data. Furthermore, the ROM section 11 is frequently accessed at the start and the end of the burst signal inasmuch as the ROM section 11 memorizes the first through the sixteenth impulse response data. Accordingly, consumption of an electric power increases in the modulator 10.

Figure 2:
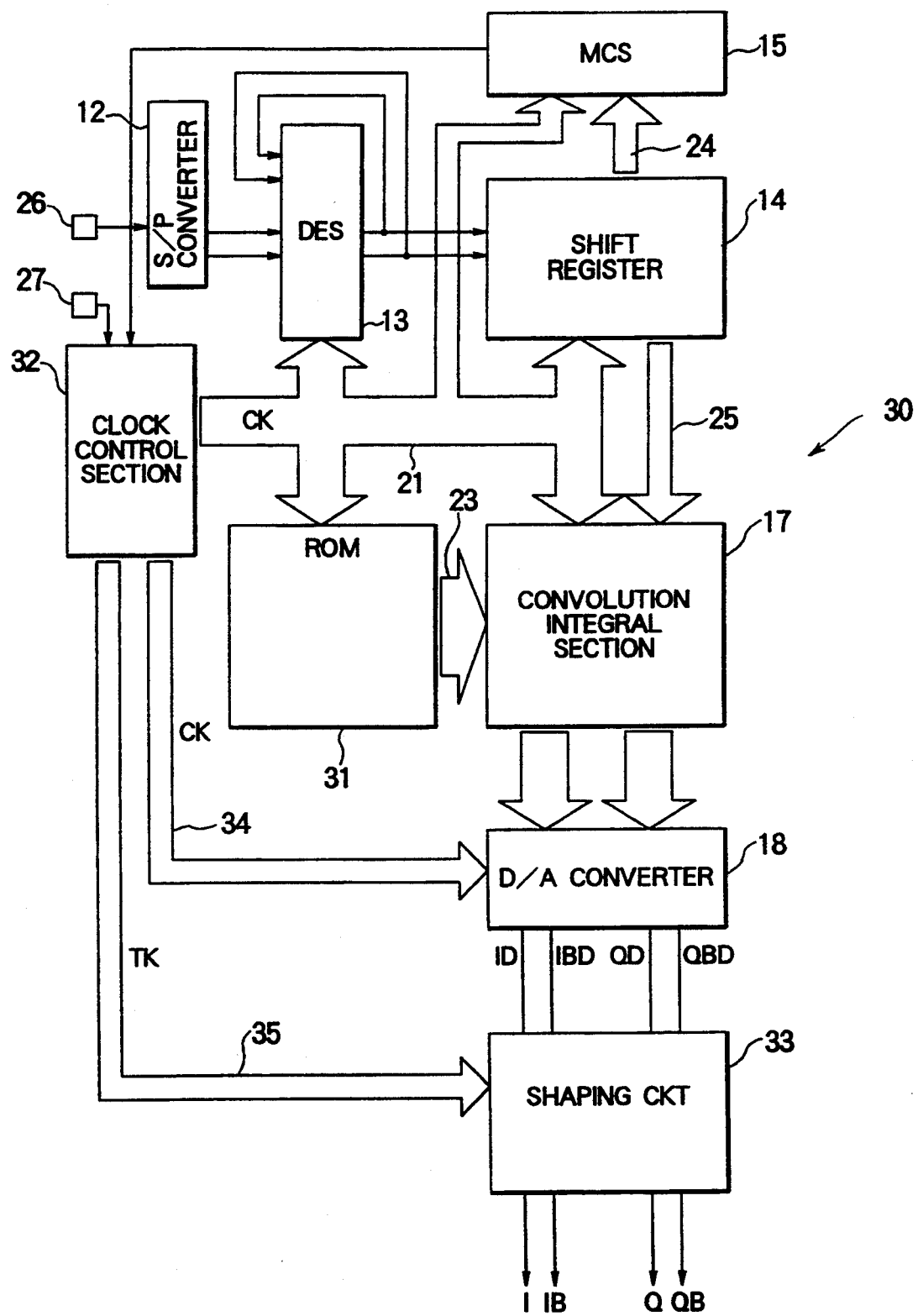
FIG. 2 is a block diagram of a modulator according to a preferred embodiment of this invention.

Referring to FIG. 2, description will proceed to a modulator of a preferred embodiment according to this invention. The illustrated modulator is different in structure from the modulator 10 illustrated in FIG. 1 and is therefore designated afresh by a reference numeral 30. The modulator 30 comprises similar parts which are designated by like reference numerals and are operable with likewise named signals.

The modulator 30 comprises a ROM section and a clock control section which are different from the ROM section 11 and the clock control section 16 described in conjunction with FIG. 1 and which are designated by different reference numerals 31 and 32, respectively. The modulator 30 further comprises a shaping circuit 33 which uses the predetermined window function, for example, Hanning window function.

The ROM section 31 memorizes a specific impulse response data having the predetermined data length, for example, sixteen bits length. More specifically, the ROM section 31 memorizes one of the first through the sixteenth impulse response data each of which is described in conjunction with FIG. 1. In the illustrated example, the specific impulse response data is equal to the sixteenth impulse response data.

In a manner similar to the clock control section 16 illustrated in FIG. 1, the clock control section 32 supplies the clock signal CK to the differential encoder section 13, the truncation symbol shift register section 14, the multiplication control section 15, and the convolution integral section 17 through the first bus 21. The clock signal CK is further supplied from the clock control section 32 to the D/A converter section 18 through a sixth bus 34.

Responsive to the burst start signal and the command signal, the clock control section 32 produces a specific address signal which is equal to the sixteenth address signal. The specific address signal is supplied from the clock control section 32 to the ROM section 31 through the first bus 21.

In a similar manner as described in conjunction with FIG. 1, specific impulse values are successively read out of the ROM section 31 in accordance with the specific address signal to be successively supplied to the convolution integral section 17. The convolution integral section 17 carries out convolution integral on the basis of the control signal as described in conjunction with FIG. 1. As a result of convolution integral, the convolution integral section 17 produces the convolution integral data signal which has the digitized inphase component signal and the digitized quantized component signal.

Supplied with the convolution integral data signal, the D/A converter section 18 produces the inphase component signal and the quadrature component signal as described in conjunction with FIG. 1.

The inphase component signal and the quadrature component signal are supplied to the shaping circuit 33. Through a seventh bus 35, the shaping circuit 33 is further supplied with a set of timing clock signals which will later be described. The shaping circuit shapes the inphase component signal and the quadrature component signal into a shaped inphase component signal and a shaped quadrature component signal by the predetermined window function.

The shaped inphase component signal has a shaped inphase component I and a shaped inverse inphase component IB. The shaped quadrature component signal has a shaped quadrature component Q and a shaped inverse quadrature component QB. In the illustrated example, the shaped inphase component signal and the shaped quadrature component signal will collectively be called the output signal which may be called the $\pi/4$ shift QPSK modulated signal.

Figure 3:
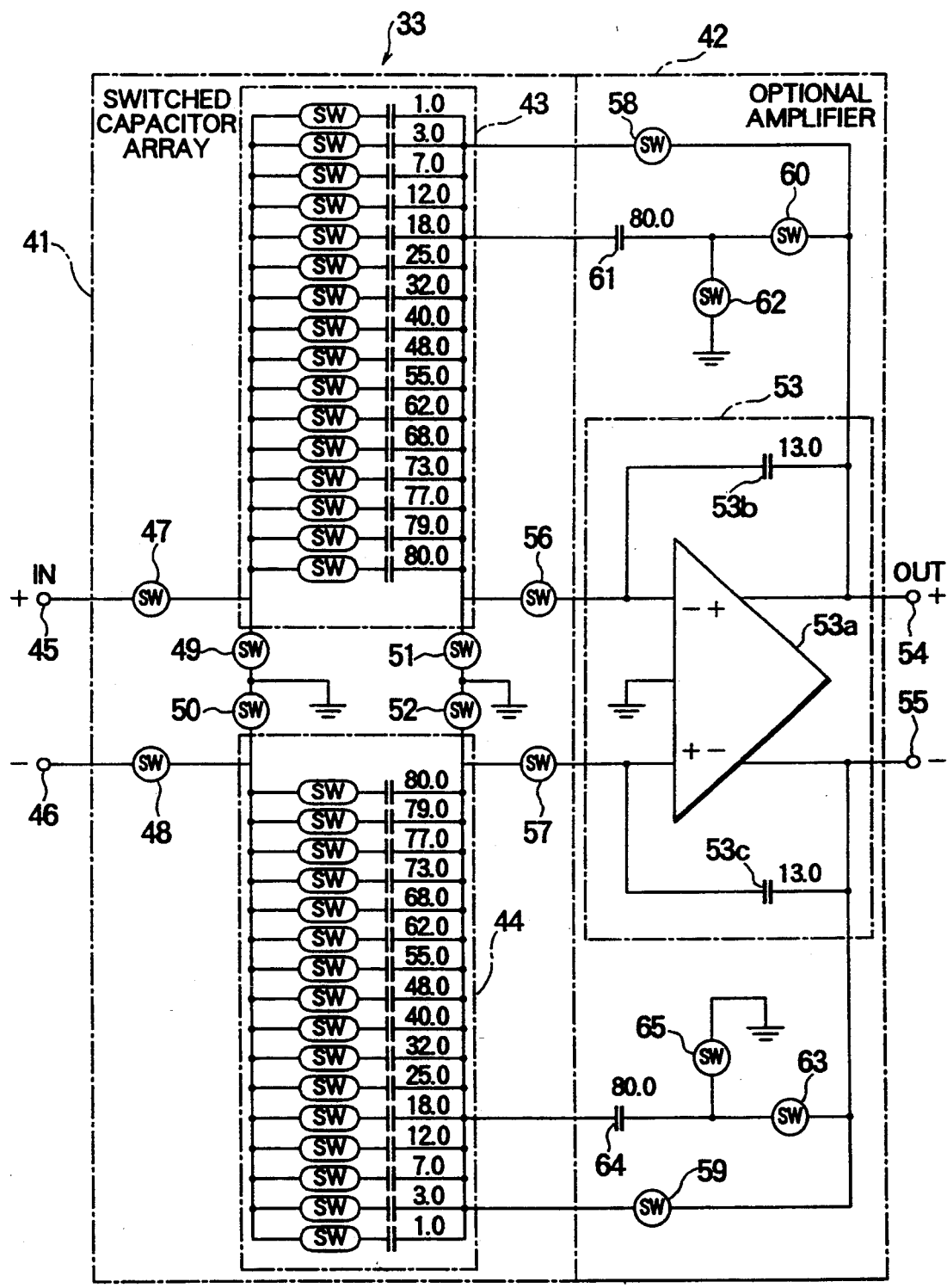
FIG. 3 is a circuit diagram for illustrating an example of a wave shaping circuit illustrated in FIG. 2.

Referring to FIG. 3, description will proceed to the shaping circuit 33 illustrated in FIG. 2. The shaping circuit 33 comprises first and second switched capacitor circuits although only the first switched capacitor circuit is illustrated in FIG. 3. The second switched capacitor circuit is similar in structure to the first switched capacitor circuit. The first switched capacitor circuit may be supplied with the inphase component signal to produce the shaped inphase component signal. The second switched capacitor circuit may be supplied with the quadrature component signal to produce the shaped quadrature component signal.

Now, attention will be directed to the first switched capacitor circuit, which will merely be called a switched capacitor circuit.

The illustrated switched capacitor circuit comprises a switched capacitor array 41 and an operational amplifier circuit 42. The switched capacitor array 41 comprises a first switched capacitor section 43 and a second switched capacitor section 44. The first switched capacitor section 43 has a plurality of switched capacitor units which are equal in number to sixteen. In the first switched capacitor section 43, the switched capacitor units will be called first primary through sixteenth primary switched capacitor units, respectively, in the order directed downwards in FIG. 3. The first primary through the sixteenth primary switched capacitor units are connected in parallel to one another as illustrated in FIG. 3. The first switched capacitor section 43 has a first input side located at the left side in FIG. 3. The first switched capacitor section 43 also has a first output side located at the right side in FIG. 3.

Similarly, the second switched capacitor section 44 has a plurality of switched capacitor units which are equal in number to sixteen. In the second switched capacitor section 44, the switched capacitor units will be called first subsidiary through sixteenth subsidiary switched capacitor units, respectively, in the order directed upwards in FIG. 3. The first subsidiary through the sixteen subsidiary switched capacitor units are connected in parallel to one another. The second switched capacitor section 44 has a second input side located at the left side in FIG. 3. The second switched capacitor section 43 also has a second output side located at the right side in FIG. 3.

The switched capacitor circuit has first and second input terminals 45 and 46 which may be supplied with the inphase component and the inverse inphase component, respectively. The first input terminal 45 is connected to the first switched capacitor section 43 through a first switch 47 at the first input side. The second input terminal 46 is connected to the second switched capacitor section 44 through a second switch 48 at the second input side.

The first and the second switched capacitor sections 43 and 44 are connected to each other through third and fourth switches 49 and 50 at the first and the second input sides. At the location between the third switch 49 and the fourth switch 50, each of the third and the fourth switches 49 and 50 is connected to the ground.

Similarly, the first and the second switched capacitor sections 43 and 44 are connected to each other through fifth and sixth switches 51 and 52 at the fist and the second output sides. At the location between the fifth switch 51 and the sixth switch 52, each of the fifth and the sixth switches 51 and 52 is connected to the ground.

The operational amplifier circuit 42 comprises an operational amplifier unit 53. As well known in the art, the operational amplifier unit 53 comprises an operational amplifier 53a and a pair of capacitors 53b and 53c. The operational amplifier 53a has first and second amplifier input terminals and first and second amplifier output terminals. The operational amplifier circuit 42 has first and second output terminals 54 and 55 which are connected to the first and the second output terminals 54 and 55, respectively.

Through a seventh switch 56, the first amplifier input terminal is connected to the first switched capacitor section 43 at the first output side. Through an eighth switch 57, the second amplifier input terminal is connected to the second switched capacitor section 44 at the second output side.

The first amplifier output terminal is connected to the first switched capacitor section 43 at the first output side through a ninth switch 58. Similarly, the second amplifier output terminal is connected to the second switched capacitor section 44 at the second output side through a tenth switch 59.

Furthermore, the first amplifier output terminal is connected to the first switched capacitor section 43 at the first output side through an eleventh switch 60 and a capacitor 61. At the location between the eleventh switch 60 and the capacitor 61, each of the eleventh switch 60 and the capacitor 61 is connected to a twelfth switch 62 which is connected to the ground. Through a thirteenth switch 63 and a capacitor 64, the second amplifier output terminal is connected to the second switched capacitor section 44 at the second output side. At the location between the thirteenth switch 63 and the capacitor 64, each of the thirteenth switch 63 and the capacitor 64 is connected to a fourteenth switch 65 which is connected to the ground.

By the way, the first primary through the seventeenth primary switched capacitor units have first primary through seventeenth primary capacities in the first switched capacitor section 43, respectively. Each of the first primary through the seventeenth primary capacities is determined by the use of the predetermined window function, for example, Hanning window function. In the illustrated example, each of the first primary through the seventeenth primary capacities is represented as a ratio to the first primary capacity in FIG. 3.

The first subsidiary through the seventeenth subsidiary switched capacitor units has first subsidiary through seventeenth subsidiary capacities in the second switched capacitor section 44, respectively. The first subsidiary through the seventeenth subsidiary capacities are equal to the first primary through the seventeenth primary capacities, respectively.

Similarly, each of the capacitors 53b, 53c, 61, and 64 has a capacity which is represented as a ratio to the first primary capacity in FIG. 3.

Figure 4:
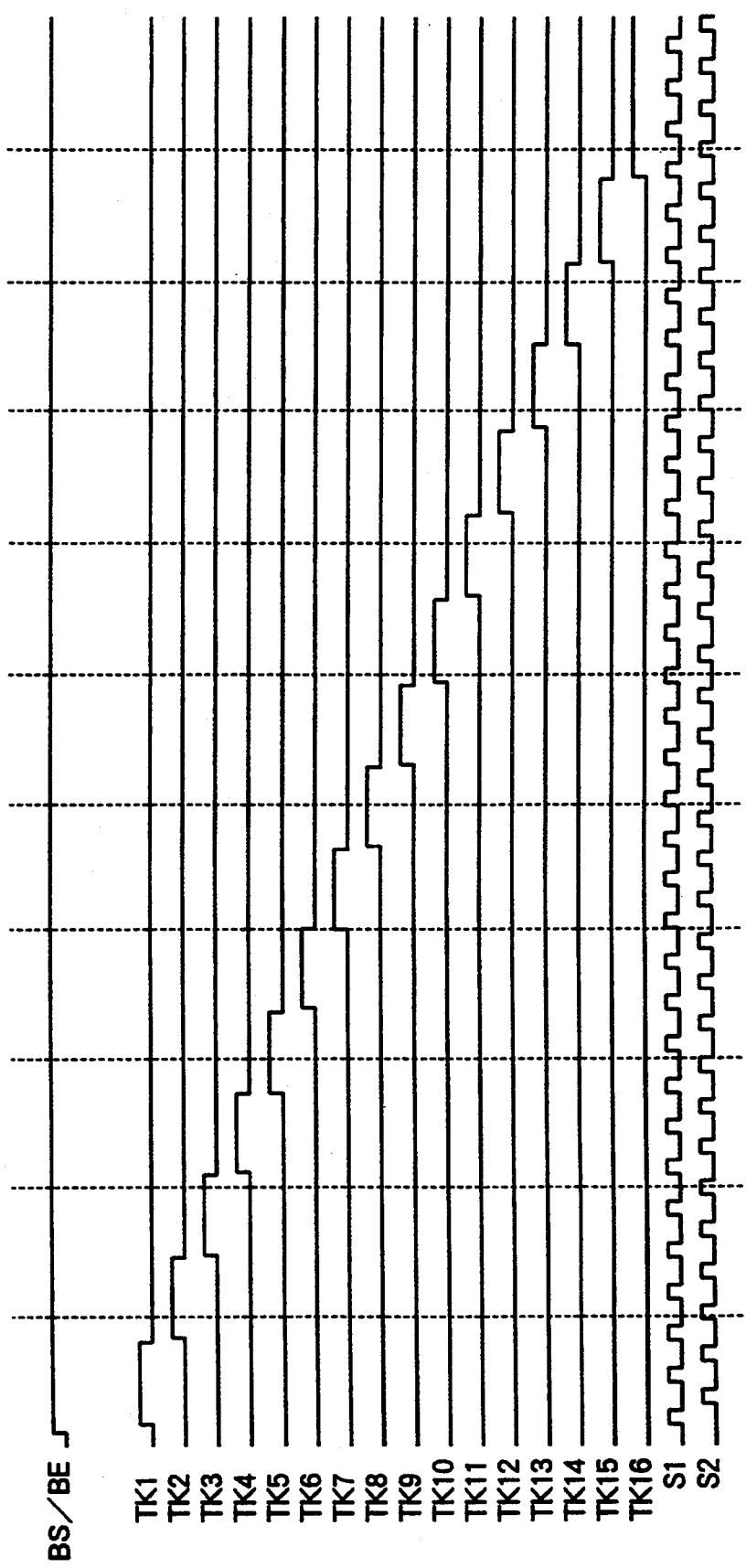
FIG. 4 is a timing chart for describing operation of the wave shaping circuit illustrated in FIG. 3.

Referring to FIG. 4 in addition to FIG. 3, the clock control section 32 (FIG. 2) produces a set of timing signals in response to the burst start signal and the command signal as described in conjunction with Fig. 2. The timing signals will be called first through sixteenth timing signals TK1 to TK16 each of which is supplied to the shaping circuit 33 through the seventh bus 35. The clock control section 32 (FIG. 1) further supplies first through third switching signals S1 to S3 to the shaping circuit 33 through the seventh bus 35 although only the first switching signal is not illustrated in FIG. 4. Although illustration is not made in FIG. 3 as regards each of signal lines for the first through the sixteenth timing signals TK1 to TK16 and the first through the third switching signals S1 to S3, each of the first through the second switched capacitor sections 43 and 44 is supplied with the first through the sixteenth timing signals TK1 to TK16. The first switching signal S1 is supplied with the ninth and the tenth switches 58 and 59. The second switching signal S2 is supplied with the first, the second, the seventh, the eighth, the eleventh, and the twelfth switches 47, 48, 56, 57, 60, and 63. The third switching signal S3 is supplied with the third, the fourth, the fifth, the sixth, the thirteenth, and the fourteenth switches 49, 50, 51, 52, 53, 62, and 65.

Referring to FIGS. 2 and 3 in addition to FIG. 4, the clock control section 43 produces the first switching signal S1 when the clock control section 32 is supplied with the burst start signal labelled BS/BE in FIG. 3. In the illustrated example, the burst start signal is representative of a high level. Responsive to the burst start signal, the clock control section 32 produces the first switching signal S1 of a high level. The leading edge of the first switching signal S1 corresponds to the leading edge of the burst start signal although the first switching signal. S1 is not shown in FIG. 4. Responsive to the first switching signal S1, the ninth and the tenth switches 58 and 59 become to an on-state.

After a predetermined time interval lapses, the clock control section 32 stops producing the first switching signal S1 at a first time instant to make the ninth and the tenth switches 58 and 59 become to an off-state.

At the first time instant, the clock control section 32 produces the first timing signal TK1 of a high level to make the first primary and the first subsidiary switched capacitor unit become an on-state. In addition, the clock control section 32 successively produces the second and the third switching signals S2 and S3. Each of the second and the third switching signals S2 and S3 has a high level at a prescribed period as shown in Fig. 4. The first and the second switching signals S2 and S3 alternatively become to the high or the low level. As a result, each of the third, the fourth, the fifth, the sixth, the thirteenth, and the fourteenth switches 49, 50, 51, 52, 53, 62, and 65 becomes to the off-state when each of the first, the second, the seventh, the eighth, the eleventh, and the twelfth switches 47, 48, 56, 57, 60, and 63 becomes to the on-state. Similarly, each of the third, the fourth, the fifth, the sixth, the thirteenth, and the fourteenth switches 49, 50, 51, 52, 53, 62, and 65 becomes to the on-state when each of the first, the second, the seventh, and eighth, the eleventh, and twelfth switches 47, 48, 56, 57, 60, and 63 becomes to the off-state.

The clock control section 32 stops producing the first timing signal TK1 and produces the second timing signal TK2 of a high level at a second time instant. As a result, the second primary and the second subsidiary switched capacitor units become to the on-state.

In a similar manner as described above, the clock control section 32 produces the third through the sixteenth timing signals TK3 to TK16 at third through sixteen time instants, respectively. Namely, the clock control section 32 produces the third through the sixteenth timing signal in the ascending order as shown in FIG. 3.

As readily understood from the above description, the clock control section makes the first primary through the sixteenth primary switched capacitor units turn on and off in the ascending order. Similarly, the clock control section makes the first subsidiary through the sixteenth subsidiary switched capacitor units turn on and off in the ascending order. As a result, the switched capacitor circuit shapes the inphase component signal into the shaped inphase component signal on the basis of the predetermined window function at a start portion of the burst signal.

Although illustration is not made in FIG. 3, the clock control section 32 continues to supply the switched capacitor circuit with the sixteenth timing signal TK16 and the second and the third switching signals S2 and S3.

When the clock control section 32 receives the burst end signal which is representative of a low level, the clock control section 32 stops producing the sixteenth timing signal TK16 of the high level at a seventeenth time instant after a prescribed time interval. At the seventeenth time instant, the clock control section 22 produces the fifteenth timing signal TR15 of the high level although illustration is not made in FIG. 4. The clock control section 32 stops producing the fifteenth timing signal TK15 at an eighteenth time instant. At the eighteenth time instant, the clock control section 32 produces the fourteenth timing signal TX14 of the high level.

In a manner similar to the above description, the clock control section 32 produces the thirteenth through the first timing signals TK13 to TK1 in the descending order at nineteenth through thirty-first time instants, respectively. The clock control section 32 stops producing the first timing signal TK1 and the second and the third switching signals S2 and S3 at a thirty-second time instant.

As a result, the switched capacitor circuit produces the shaped inphase component signal and the shaped quadrature component signal on the basis of the predetermined window function at an end portion of the burst signal.

In a similar manner as described above, the second switched capacitor circuit shapes the quadrature component signal into the shaped quadrature component signal.

Now, it will be assumed that the ROM 31 and the shaping circuit 33 occupy a sum area and that the ROM 11 illustrated in FIG. 1 occupies a ROM area. In case where a pair of switched capacitor circuits are used as shaping circuit 33 and are manufactured by the use of an integrated circuit, the sum area is smaller that the ROM area. More particularly, the sum area becomes to about ⅓ of the ROM area.

While this invention has thus far been described in conjunction with a preferred embodiment thereof, it will readily be possible for those skilled in the art to put this invention into practice in various other manners. For example, it is possible to use a resistor unit instead of the switched capacitor unit. The resistor unit may have a resistor and a switch. Although Hanning window function is used as the predetermined window function in the preferred embodiment, Hamming window function may be used as the predetermined window function.

What is claimed is:

1. A modulator supplied with an input digital signal for outputting an output signal therefrom in accordance with said input digital signal, said modulator comprising:

first producing means, on the basis of said input digital signal, for producing a phase information signal representative of phase information of said input digital signal;

memory means for memorizing an impulse response data of said phase information that has a predetermined data length;

accessing means for accessing said memory means to produce impulse response values of said impulse response data in accordance with said phase information signal;

second producing means supplied with said impulse response values for producing a modulated signal on the basis of said impulse response values; and shaping means for shaping said modulated signal into a shaped modulated signal in accordance with a predetermined window function to produce said shaped modulated signal as said output signal.

2. A modulator as claimed in claim 1, wherein said first producing means comprises:

encoder means for encoding said input digital signal into an encoded signal representative of said phase information; and holding means supplied with said encoded signal for holding said encoded signal of said predetermined data length as a held signal.

3. A modulator as claimed in claim 1, wherein said accessing means comprises:

command producing means for producing a command signal on the basis of said held signal; and third producing means supplied with said command signal, for producing an address signal to read said impulse response values out of said memory means.

4. A modulator as claimed in claim 3, said impulse response data having primary and subsidiary impulse response sequences which are different in amplitude from each other, wherein:

said command signal has a command which is representative of either one of said primary and said subsidiary impulse response sequences.

5. A modulator as claimed in claim 1, wherein said second producing means comprises:

convolution means for carrying out convolution integral of said impulse response values in accordance with said held signal to produce a digital modulated signal; and D/A converter means for converting said digital modulated signal into said modulated signal.

6. A modulator as claimed in claim 5, said modulated signal having an inphase component signal and a quadrature component signal.

7. A modulator as claimed in claim 1, wherein said predetermined window function is either one of Hanning window function and Hamming window function.

8. A modulator as claimed in claim 1, wherein said shaping means is composed of a switched capacitor circuit.

9. A modulator as claimed in claim 8, wherein said switched capacitor circuit comprises:

a plurality of switched capacitor units having switches and capacities, respectively, said capacities being different from one another and being determined by the use of said predetermined window function, said switched capacitor units being selectively operated;

supplying means for supplying said modulated signal to said switched capacitor units; and outputting means connected to said switched capacitor units for outputting said shaped modulated signal as said output signal.

10. A modulator as claimed in claim 9, wherein said output means is composed of an operational amplifier circuit.

11. A modulator as claimed in claim 9, further comprising a signal producing means for producing a plurality of timing signals to selectively control operation of said switched capacitor units.

* * * * *